US008654190B2

(12) United States Patent
Kawaragi

(10) Patent No.: US 8,654,190 B2
(45) Date of Patent: Feb. 18, 2014

(54) IMAGING POSITION CORRECTION METHOD, IMAGING METHOD, AND SUBSTRATE IMAGING APPARATUS

(75) Inventor: Hiroshi Kawaragi, Sapporo (JP)

(73) Assignee: Tokyo Electron Limited, Tokyo (JP)

( * ) Notice: Subject to any disclaimer, the term of this patent is extended or adjusted under 35 U.S.C. 154(b) by 1118 days.

(21) Appl. No.: 12/227,141

(22) PCT Filed: May 9, 2007

(86) PCT No.: PCT/JP2007/059602
§ 371 (c)(1),
(2), (4) Date: Nov. 7, 2008

(87) PCT Pub. No.: WO2007/129733
PCT Pub. Date: Nov. 15, 2007

(65) Prior Publication Data
US 2009/0268021 A1 Oct. 29, 2009

(30) Foreign Application Priority Data
May 9, 2006 (JP) ................................. 2006-129778

(51) Int. Cl.
*H04N 7/18* (2006.01)
*H04N 5/262* (2006.01)
(52) U.S. Cl.
USPC ............................................ 348/87; 348/239
(58) Field of Classification Search
USPC ............................................................ 348/87
See application file for complete search history.

(56) References Cited

U.S. PATENT DOCUMENTS

| 6,246,788 | B1 * | 6/2001 | Pattikonda et al. | 382/147 |
| 6,445,813 | B1 * | 9/2002 | Ikurumi et al. | 382/147 |
| 6,925,203 | B1 * | 8/2005 | Tanaka | 382/151 |
| 6,941,646 | B2 * | 9/2005 | Suhara | 29/740 |
| 7,155,052 | B2 * | 12/2006 | Geshel et al. | 382/144 |
| 7,692,144 | B2 * | 4/2010 | Watanabe et al. | 250/307 |
| 7,729,528 | B2 * | 6/2010 | O'Dell et al. | 382/149 |
| 2002/0196336 | A1 * | 12/2002 | Batson et al. | 348/86 |
| 2004/0081349 | A1 * | 4/2004 | Chaya et al. | 382/145 |
| 2006/0147901 | A1 * | 7/2006 | Jan et al. | 435/4 |
| 2006/0203109 | A1 * | 9/2006 | Ono | 348/239 |
| 2009/0273668 | A1 * | 11/2009 | Mirtich et al. | 348/86 |

FOREIGN PATENT DOCUMENTS

| JP | H06-258394 A | 9/1994 |
| JP | H09-199553 A | 7/1997 |
| JP | H11-031228 A | 2/1999 |
| JP | 2000-329521 A | 11/2000 |
| JP | 2001-242092 A | 9/2001 |
| JP | 2002-181733 A | 6/2002 |
| JP | 2003-208605 A | 7/2003 |
| JP | 2004-342665 A | 12/2004 |

* cited by examiner

*Primary Examiner* — Firmin Backer
*Assistant Examiner* — James Edwards
(74) *Attorney, Agent, or Firm* — Pearne & Gordon LLP

(57) ABSTRACT

An imaging method for imaging an image on a substrate at an accurate position while relatively moving the substrate and the imaging unit. The imaging method includes the steps of taking an image while relatively moving the substrate and a camera, predicting a shift amount of the imaging position and the position of the actual imaging when generating an imaging trigger without a correction, based on the relative moving speed and moving distance of the substrate and camera, and correcting the imaging trigger for shifting the timing of generating the imaging trigger only for the time corresponding to the predicted shift amount.

16 Claims, 11 Drawing Sheets

IMAGING POSITION CORRECTION METHOD, IMAGING METHOD, AND SUBSTRATE IMAGING APPARATUS

TECHNICAL FIELD

The present invention relates to an image position correction method, substrate imaging apparatus, and computer program. More specifically, the present invention relates to a method for correcting an imaging position on a substrate while relatively moving the substrate and imaging unit, and an imaging apparatus therefor.

BACKGROUND ART

In semiconductor manufacturing techniques, an inspection of a chip which is processed in a wafer state before dicing, has been performed.

To inspect each chip in a wafer state, electrical operations of each chip are examined by pressing an inspection probe on an electrode pad of each chip. At this time, a probe trace (needle trace) is formed on the electrode pad of the chip.

Patent document 1 discloses a technique to determine whether the examination is performed normally or not from a pattern of the needle trace image obtained by imaging the electrode pad.

To perform this type of examination accurately, it is necessary to accurately align the relative position of a wafer and a camera. For example, patent documents 2 to 5 disclose techniques to align a wafer position to a probe to inspect the wafer.

For example, the technique disclosed in the patent document 2, when performing probing, an image measuring camera images the trace that is placed by a probe on a substrate to be inspected, coordinates of the trace are measured by using the image taken. A position control unit compares specified coordinates and the coordinates of the trace measured by the image measuring camera to obtain a conversion equation [A] between a camera coordinate series and a probe coordinate series. Further, the image measuring camera measures a position of a mark for position correction placed on a known position on the substrate to be inspected. The position control unit compares the known coordinates of the position correction mark and the coordinates of the position correction mark measured with the image measuring camera to obtain a conversion equation [B] between the camera coordinate series and the substrate coordinate series. The position control unit combines the conversion equations [A] and [B] to obtain a coordinate conversion equation [C] between the substrate coordinate series and the probe coordinate series. The position control unit obtains a position of the probe in the substrate coordinate series using the conversion equation [C], and corrects the position of the probe against the substrate to be inspected.

Patent document 1: Japanese unexamined patent application publication No. 2005-045194.

Patent document 2: Japanese unexamined patent application publication No. H06-258394

Patent Document 3: Japanese unexamined patent application publication No. H9-199553.

Patent Document 4: Japanese unexamined patent application publication No. H11-31228.

Patent Document 5: Japanese unexamined patent application publication No. 2000-329521.

DISCLOSURE OF INVENTION

Problems to be Solved by the Present Invention

To shorten the time for determining whether an examination of a chip is performed normally or not by a needle trace, it is desirable to take an image of a probe trace of each chip while moving a wafer, rather than stopping the wafer by each chip.

Due to various factors, there is a time lag between the generation of an imaging trigger and when imaging is actually executed. For this reason, in a case when imaging a specific position of a wafer while relatively moving the imaging apparatus and the wafer, an image is taken for a position that is past the specific position when taking an image responding to the imaging trigger.

Therefore, in order to image the specific position, the timing for generating the imaging trigger needs to be made earlier so as to image the specific position.

Patent documents 2 to 5 disclose methods for correcting static deviation of a control amount of a stage and a position of a subject to be measured. However, they do not disclose a method for accurately imaging a predetermined position of a subject to be imaged in a case when imaging the subject be imaged with a camera while moving the subject and camera relatively.

Similar problems occur in various scenes where imaging a subject with a camera while relatively moving the subject and camera.

The present invention has been made considering the above situations, and an object is to enable an imaging apparatus to image a desired position of a subject while relatively moving the subject and the imaging apparatus.

SUMMARY OF THE INVENTION

In order to achieve the above objective, an imaging position correction method according to a first aspect of the present invention includes the steps of, moving a subject and camera relatively;

taking an image of the subject with the camera in response to an imaging trigger;

predicting a shift amount of a position where the imaging trigger will be generated and a position of an image of the substrate based on the relative speed of the substrate and the camera when taking the image on the substrate in the step for taking an image;

correcting a timing to generate the imaging trigger to a timing where the camera is in a position that is shifted from the imaging position of the substrate by a correction amount based on the shift amount predicted in the step for predicting a shift amount.

The step for predicting a shift amount may predict a shift amount based on the relative moving speed and the moving distance of the substrate and the camera.

The method for correcting an imaging position further including the steps of:

taking an image of a base substrate while moving the base substrate and the camera relatively; and measuring a shift amount of an imaging trigger and an imaging position of the base substrate from the image taken in the step for taking an image of the base substrate;

wherein the step for measuring a shift amount is to predict the shift amount of an imaging trigger corresponding to the relative moving speed of the substrate and the camera and the imaging position of the substrate based on the shift amount measured in the step for measuring.

For example, the step for imaging a base substrate is to take an image of the base substrate while moving the base substrate and camera at a plurality of different speeds.

For example, the plurality of different speeds includes a plurality of different speeds for each of two directions perpendicular to a plane of the base substrate.

The shift amount predicted in the step for predicting a shift amount includes the shift amount based on the relative displacement from a base position of the substrate and the camera.

In order to achieve the above objective, a method for imaging pertaining to a second aspect of the present invention includes the steps of, moving a subject and camera relatively, taking an image of the subject with the camera in response to an imaging trigger, and generating an imaging trigger at a timing that is corrected based on the relative moving speed of the substrate and camera.

For example, the step for generating an imaging trigger corrects the timing for generating an imaging trigger based on the relative moving speed and a moving distance of the substrate and camera.

This imaging method further includes a step for predicting a shift amount of a position at which an imaging trigger is to be generated and an imaging position of the substrate based on the relative moving speed and moving distance of the substrate and the camera. The step for generating an imaging trigger is to generate an imaging trigger at a timing when the camera is at a position before the imaging position of the substrate for only the shift amount predicted in the step for predicting the shift amount.

In order to achieve the above objective, a substrate imaging apparatus pertaining to a third aspect of the present invention includes, an imaging unit for imaging a subject on a substrate;

a moving unit for moving the substrate and the imaging unit relatively when taking an image of the substrate;

a shift amount prediction unit for predicting a shift amount of an imaging trigger and an imaging position of the substrate based on the relative moving speed of the substrate and the imaging unit when taking an image of the substrate; and an imaging trigger correction unit for shifting a position for generating the imaging trigger from a position where the imaging unit is located to an imaging subject area of the substrate by only the shift amount predicted by the shift amount prediction unit.

For example, the shift amount prediction unit predicts a shift amount corresponding to the relative moving speed and relative moving distance of the substrate and the imaging unit.

For example, the substrate imaging apparatus further includes a substrate imaging unit for taking an image on a substrate while relatively moving the substrate and the imaging unit; and a measurement unit for measuring a shift amount of an imaging trigger and an imaging position of the substrate from an image taken by the substrate imaging unit;

wherein a shift amount prediction unit may predict the shift amount of the imaging trigger by using a relative speed of the substrate and the imaging unit and the imaging position of the substrate based on the shift amount measured by the measuring unit.

For example, the substrate imaging unit takes an image of the substrate while moving the substrate and imaging unit relatively at a plurality of different speeds.

The plurality of different speeds may include a plurality of different speeds for each of two directions perpendicular to a plane of the substrate.

The shift amount predicted by the shift amount prediction unit may include a shift amount based on a relative displacement from the base position of the substrate and imaging unit.

In order to achieve the above object, a substrate imaging apparatus pertaining to a fourth aspect of the present invention includes, an imaging unit for imaging a subject in response to an imaging trigger;

a moving unit for moving the subject and imaging unit relatively;

a shift amount prediction unit for predicting a shift amount of an actual imaging position and a position where the imaging unit is located when an imaging trigger is generated based on a relative moving speed of the subject and the imaging unit; and an imaging trigger generation unit for generating the imaging trigger when the imaging unit is located on a moving path before an imaging subject area of the subject only by the predicted shift amount.

The shift amount prediction unit may predict a shift amount based on the relative moving speed and moving distance of the subject and imaging unit.

In order to achieve the above object, a computer program pertaining to a fifth aspect of the present invention comprises a computer program for a computer to execute the steps of, moving a subject and camera relatively;

taking an image of the subject with the camera in response to an imaging trigger;

predicting a shift amount of a position where the imaging trigger is generated, and a position of imaging the subject based on a relative moving speed (and moving distance) of the subject and the imaging unit when taking the image of the subject in the step for taking an image;

correcting a timing to generate the imaging trigger to a timing where the imaging unit is located in a position that is shifted from the imaging position of the subject by a correction amount based on the shift amount predicted in the step for predicting the shift amount.

EFFECT OF THE PRESENT INVENTION

The method for correcting an imaging position and a substrate imaging apparatus pertaining to the present invention enables imaging a planned position of a wafer on a stage moving at a high speed. Further, by applying the method for correcting an imaging position by each substrate inspection device, prediction formulas reflecting stage drive characteristics for each of the substrate inspecting devices is derived, thereby the correction of the imaging position may be performed accordingly.

EXPLANATION OF SYMBOLS

Figure 1:
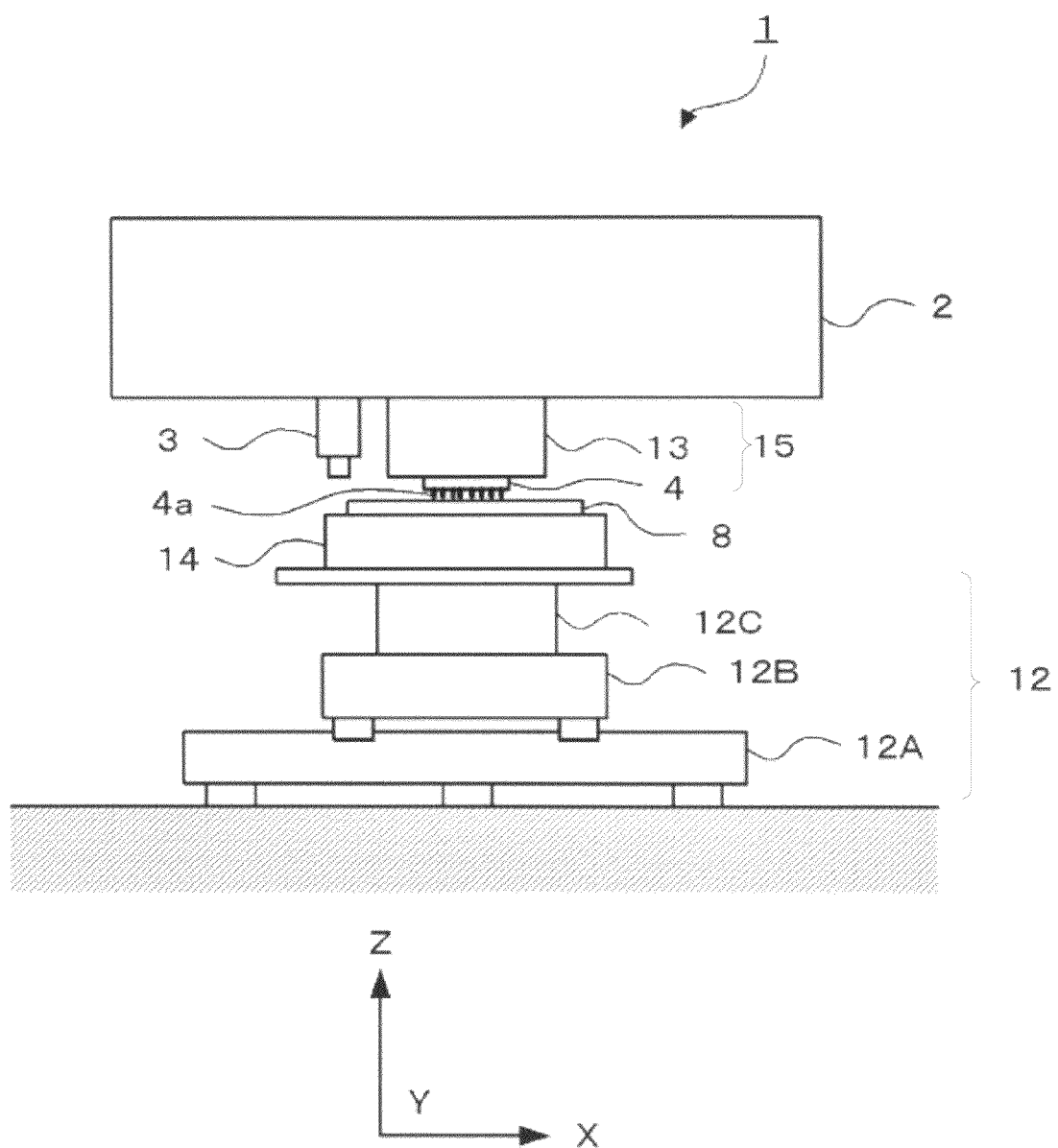
FIG. 1 is a configuration diagram of a substrate inspection device pertaining to an embodiment of the present invention.

1 Inspection device
2 Inspection control unit
3 Camera
4 Probe card
4a Probe
5 Stage driving section
6 Stage position detection section
7 Position detecting sensor
8 Wafer (semiconductor substrate)
8a Electrode pad
9 Substrate imaging device
10 Stage controlling device
12 Loader unit
13 Probe control section
14 Stage
15 Prober unit
16 Chip
20 Internal bus
21 Control unit
22 Main memory unit
23 External memory unit
24 Operating unit
25 Input/output
26 Display

DETAILED DESCRIPTION OF INVENTION

Embodiments of the present invention will be explained referring to the figures.

As shown in FIG. 1, an inspection device 1 pertaining to an embodiment of the present invention is provided with a loader unit 12 to transfer a testing object, such as a wafer (semiconductor) 8, a prober 15 for performing electrical characteristics inspections on the wafer 8, camera 3 for imaging the wafer 8, and an inspection control unit 2 for determining whether the examination of a chip formed on the wafer 8 is performed normally or not from the image of the camera 3.

The loader unit 12 is, for example, provided with a placing section to place a cassette storing 25 wafers 8, and a wafer transfer system for transferring the wafer 8 piece by piece from the cassette on this placing section. The wafer 8 as an inspection object is fixed on a stage 14 attached on the loader unit 12.

The loader unit 12 moves the stage 14 in three axis directions by X-Y-Z tables 12A, 12B and 12C, which are a moving system for the orthogonal three axis (X-axis, Y-axis and Z-axis), and also rotates the stage 14 around the Z-axis. Concretely, the loader unit 12 has the Y table 12A moving in a Y direction, X table 12B moving over this Y table 12A in a X direction, and the Z table 12C moving vertically in a Z direction which is arranged by aligning the center of the X table 12B and the center of axis, and the stage 14 is moved in X, Y, and Z directions. Further, the stage 14 rotates in forward and reverse directions in a predetermined range through a rotation drive system around the Z axis.

Figure 3:
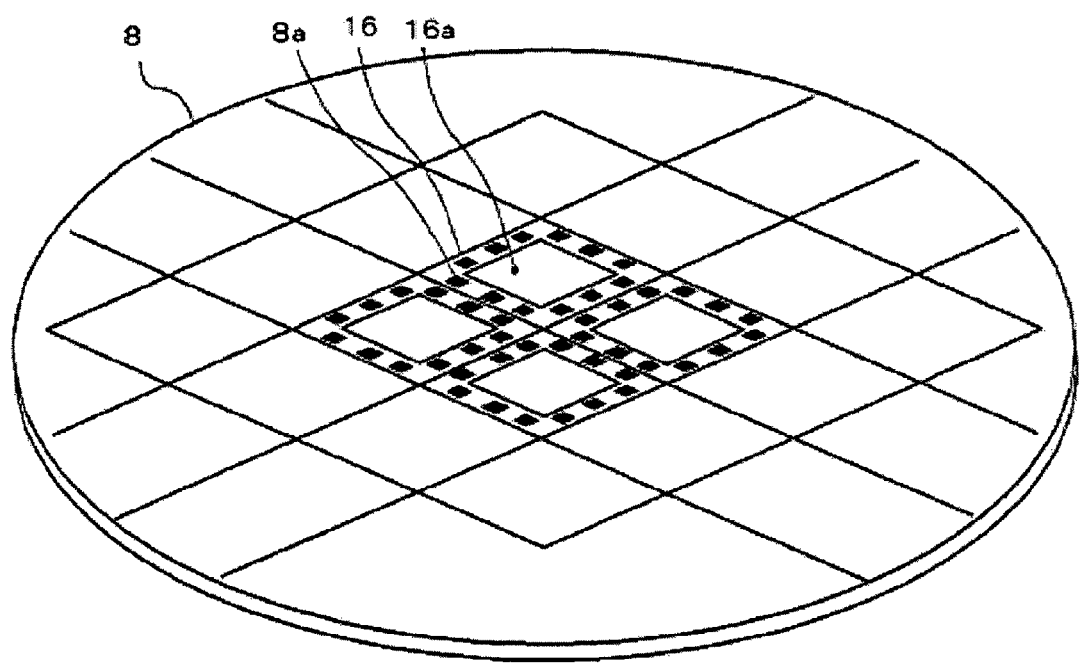
FIG. 3 is a partial view of an example of a wafer (substrate).
Figure 4:
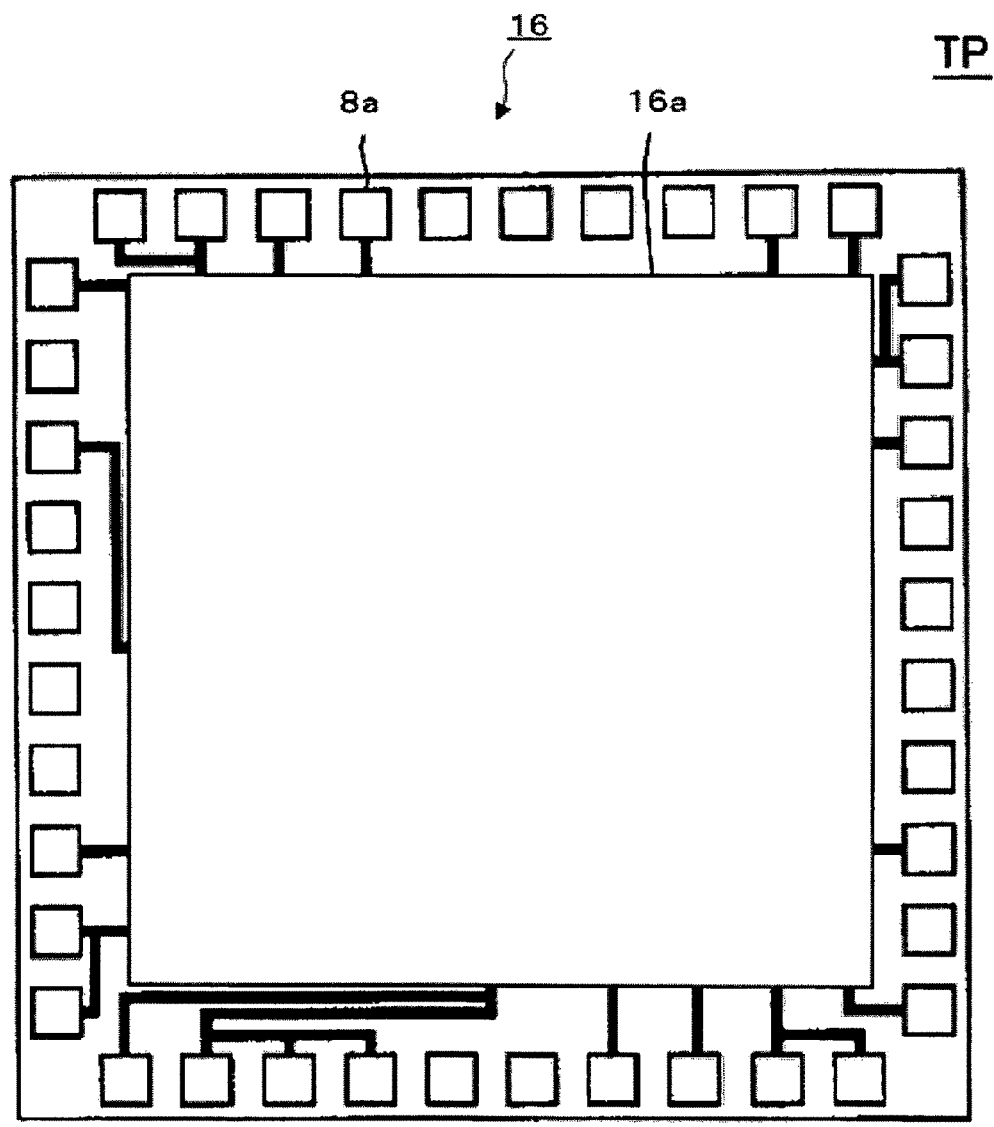
FIG. 4 is a plane view illustrating an example of chip formed on a wafer.

The prober 15 is provided with a probe card 4 and a probe control section 13 for controlling the probe card 4. As shown in FIG. 3, chips 16 to be inspected are formed in a matrix on the wafer 8. On the chip 16, formed are a semiconductor integrated circuit 16a and an electrode pad 8a for bonding a wire to inputs/outputs or passing an electric signal as shown in FIGS. 3 and 4. The electrode pad 8a is formed from, for example, a conductive metal, such as copper, copper alloy, aluminum etc.

The probe card 4 shown in FIG. 1 contacts the probe 4a with the electrode pad 8a formed on the chip 16, applies a signal (e.g. a test pattern signal) for measuring the characteristics of the chip 16, and takes out a reply signal from the chip 16 through the probe 4a.

The prober 15 is provided with an alignment system for aligning the probe 4a of the probe card 4 and the wafer 8. The prober 15 aligns the position of the probe card 4, electrically contacts the probe 4a to the electrode pad 8a of the wafer 8, and measures a characteristic value of the chip 16 formed on the wafer 8.

When inspecting the chip 16, the prober 15 contacts the probe 4a to the electrode pad 8a with an adequate needle pressure to decrease contact resistance. For this reason, a probe trace remains on the electrode pad 8a from the contact of the probe 4a. After inspecting the chip 16, the inspection device 1 determines the position, size and shape of the probe trace by the probe 4a from an image of the electrode pad 8a. When the probe trace is formed in a normal shape in a predetermined range of the electrode pad 8a, the inspection device 1 determines that the inspection of the chip 16 was performed by the prober 15 properly.

When imaging the wafer 8, the inspection device 1 switches the prober 15 and camera 3 so as to face the camera 3 to the wafer 8, or moves the stage 14 to the camera 3 side so as to face the wafer 8 to the camera 3.

For example, the camera 3 is formed from a digital still camera, such as, a CCD (Charge Coupled Device) camera, CMOS (Complimentary Metal Oxide Semiconductor) camera etc. The camera 3 takes the image of the wafer 8 responding to the command of the inspection control section 2, and supplies the image data to the inspection control unit 2. When taking the image of wafer 8 with the camera 3, there may be cases where the image is taken while the wafer 8 is still, or the image may be taken while moving the stage 14. The camera 3 preferably has an autofocus system and a lighting device. The camera 3 may take an image of the subject with a light, other than a visible light, such as infrared rays.

The inspection control section 2 is formed from a computer device to control the operation of the entire inspection device 1.

Figure 2:
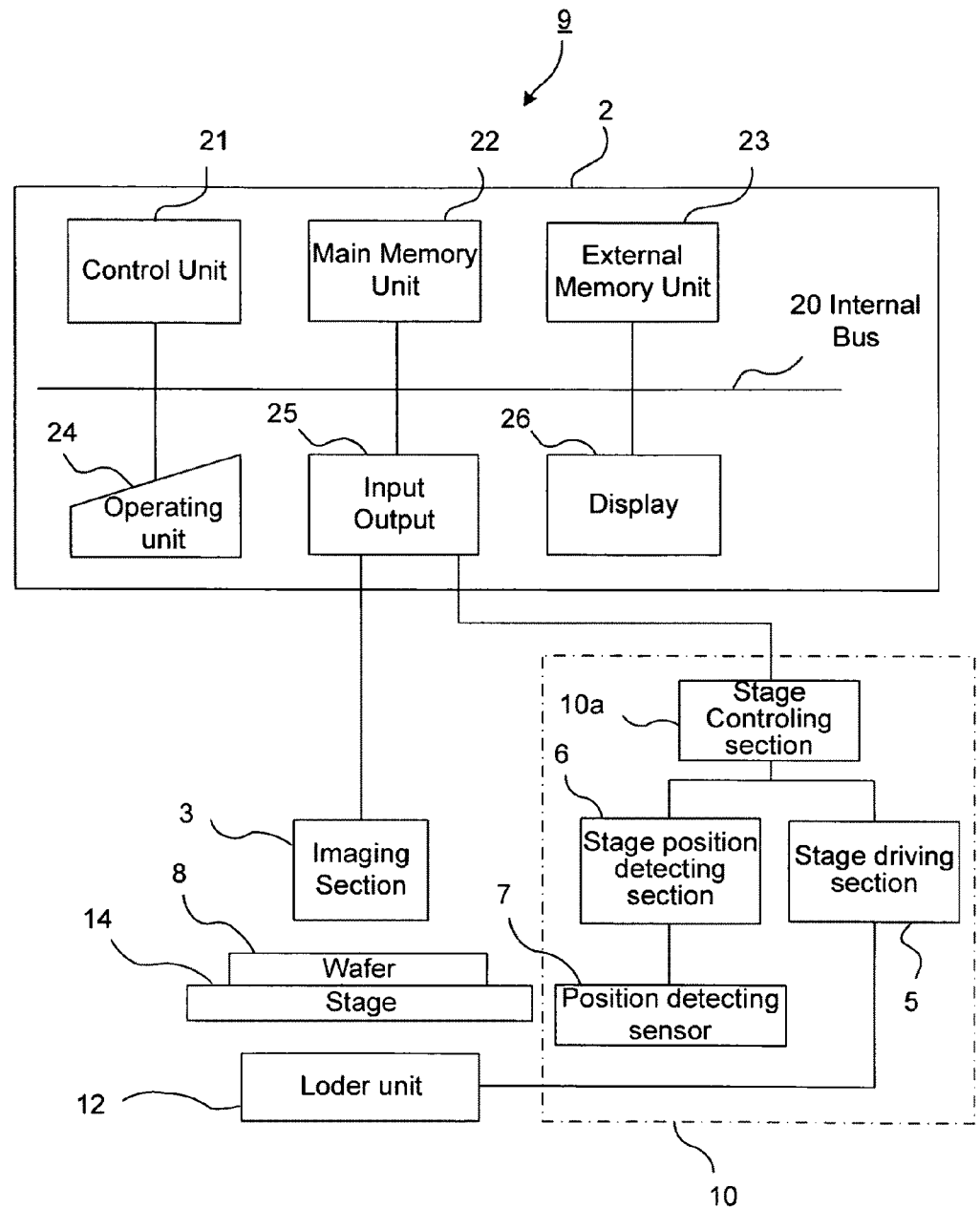
FIG. 2 is a block diagram illustrating a configuration of a substrate imaging device in the inspection device of FIG. 1.

Next explained, referring to FIG. 2, is a circuit configuration of a section in the inspection device 1 having the configuration described above where it is determined whether the inspection of the chip 16 by the prober 15 is properly performed or not by using the image obtained from imaging (hereinafter referred as a substrate imaging device 9).

As shown in FIG. 2, the substrate imaging device 9 is formed from the inspection control unit 2, camera 3, loader unit 12, stage 14 and a stage controlling device 10.

The inspection control unit 2, is provided with a control unit 21, main memory unit 22, external memory unit 23, operating unit 24, input/output 25 and display 26. The main memory unit 22 and external memory unit 23, operating unit 24, input/output 25, and display 26 are connected to the control unit 21 thorough an internal bus 20.

The control unit 21 is formed from a CPU (Central Processing Unit) etc. The control unit 21 takes an image of the electrode pad 8a formed on the wafer 8, and executes a process to determine from the image whether the inspection of chip 16 is performed normally or not according to a control program loaded on the main memory unit 22.

The main memory unit 22 is formed from RAM (Random-Access Memory) etc., and loads the control program stored in the external memory unit 23. The main memory unit 22 is also used as a work area of the control unit 21.

The external memory unit 23 is formed from a nonvolatile memory, such as, ROM (Read Only Memory), flash memory, a hard disk, DVD-RAM (Digital Versatile Disc Random-Access Memory), DVD-RW (Digital Versatile Disc Rewritable) etc. The external memory unit 23 stores the program or the data for the control unit 21 to perform the process described above in advance. Further, the external memory unit 23 loads the stored program or data into the main memory unit 22 and the control unit 21 memorizes the data stored in the main memory unit 22.

The operating unit 24 is formed from a pointing device, such as keyboard, mouse, or the like, and an interface device connecting the keyboard and pointing device etc to the internal bus 20. Through the operating unit 24, the start of evaluation measurement or selection of a measuring method etc. are input and supplied to the control unit 21.

The input/output 25 is formed from a serial interface or LAN (Local Area Network) interface for connecting the stage controlling unit 10 and camera 3 that are controlled by the inspection controlling device 2. Through the input/output 25, a command to move the wafer is given to the stage control device 10, and the positioning information for the stage is input from the stage position detection section through the stage control section 10a. Further, an instruction to image (imaging trigger) is output to the camera 3 and image data is input from the camera 3.

The display 26 is formed from a CRT (Cathode Ray Tube) or LCD (Liquid Crystal Display) etc. to display a taken image or the result of a determination of normality of the inspection.

The camera 3 is formed from a digital camera etc.

The stage control device 10 is provided with a stage driving section 5, stage position detection section 6, position detection sensor 7, and a stage control section 10a.

The stage driving section (driver) 5 is a drive circuit for driving the actuator of the loader section 12. The stage driving section 5 drives the loader section 12 in each axis direction according to an instruction from the stage controlling section (controller) 10a based on the setting data of the inspection control section 2. The stage position detection section 6 inputs a signal from the position detection sensor 7 detecting the position of the stage 14 and outputs the stage position data to the inspection control section 2 through the stage control section 10a. The stage position detection section 6 at least detects the position of the X-axis and Y-axis direction of the stage 14.

The position detection sensor 7 is, for example, formed from an actuator or pulse encoder mounted with a ball screw, or a linear scale attached to each table of the loader unit 12, or an optical distance measuring device, such as a laser measurement.

The stage control section 10a controls the stage driving section 5 according to the setting data of the inspection control unit 2 to drive the loader unit 12 to each axis direction.

The stage control device 10 is a part of the prober 15 and is commonly used by the prober 15 and imaging device 9.

Next, an imaging method, image position correction method, and method for judging whether the inspection by the prober was performed properly or not according to various embodiments are hereinafter explained.

There is a time delay when the substrate imaging device 9 generates an imaging trigger for instructing the camera 3 to take an image to exam a probe trace until the imaging is completed. For this reason, the position of the camera where the camera 3 actually takes an image shifts from the position where the camera 3 was located at the time when the imaging trigger was generated. In other words, the camera 3 takes images at a position that is delayed from the original imaging position, and which is in the moving direction. The electrical delay from the generation of the imaging trigger until an image is actually taken when the stage 14 moves in a constant speed, the shift amount D can be calculated from a linear function of the drive speed V of the stage (for example (D=V·t), where t=delay time caused by the electrical delay.

However, the loader unit 12 is formed from various members such as the motor for driving in three axis directions, the motor for rotating the stage, ball screws for each axis, a stage base, and stage 14. The various members are in a complex combination. The loader unit 12 may be provided with a polishing unit for polishing the probe card 4 as an optional part. Further, the stage 14 may be formed from a special material, or formed in a special shape or size according to the types of wafer 8 that are being inspected. For this reason, the loader unit 12 which drives the stage has many variations.

In this way, there is an individual variability in different options or in each component, thus, the drive characteristics of the loader unit 12 and stage 14 for each substrate imaging device 9 may vary. For this reason, the shift amount cannot be obtained uniformly by the linear function of the stage drive speed.

The shift amount is affected by the drive speed of the stage 14 and further affected by the distance in the drive axis direction from the moving stage point to the imaging point. As a result, the shift amount can be obtained approximately to the linear function consisting of the stage drive speed term, a distance term from the stage drive starting point, and a constant term.

When the drive (moving) speed of the stage is V and the distance from the stage drive starting point is L, the shift amount D from the position of the imaging trigger generation position (position where the optic axis of the camera 3 is facing at the time of imaging trigger generation) can be indicated with the following prediction formula (1).

$$D = b0 + b1 \cdot V + b2 \cdot L \tag{1}$$

Here, b0 is a constant term, b1 is a coefficient of speed term, and b2 is a coefficient of the distance term.

The substrate imaging device 9 determines the coefficients of each term in the prediction formula (1) by measuring the shift of the imaging position of the substrate which becomes a baseline.

The substrate imaging device 9 predicts the shift amount D at the time of imaging the chip 16 on the wafer 8 to be examined using the obtained prediction formula (1) (the shift amount with the imaging position when performing the imaging operation without correcting the imaging planned position and generation timing of the imaging trigger). By correcting the generation timing of the imaging trigger for only the time corresponding to the predicted shift amount D, the planned position of the wafer 8 on the stage 14 which moves in high speed, can be imaged.

The substrate imaging device 9 determines coefficients b0, b1 and b2 of the prediction formula (1) by the following procedure.

(Base Position Determination)

Figure 5:
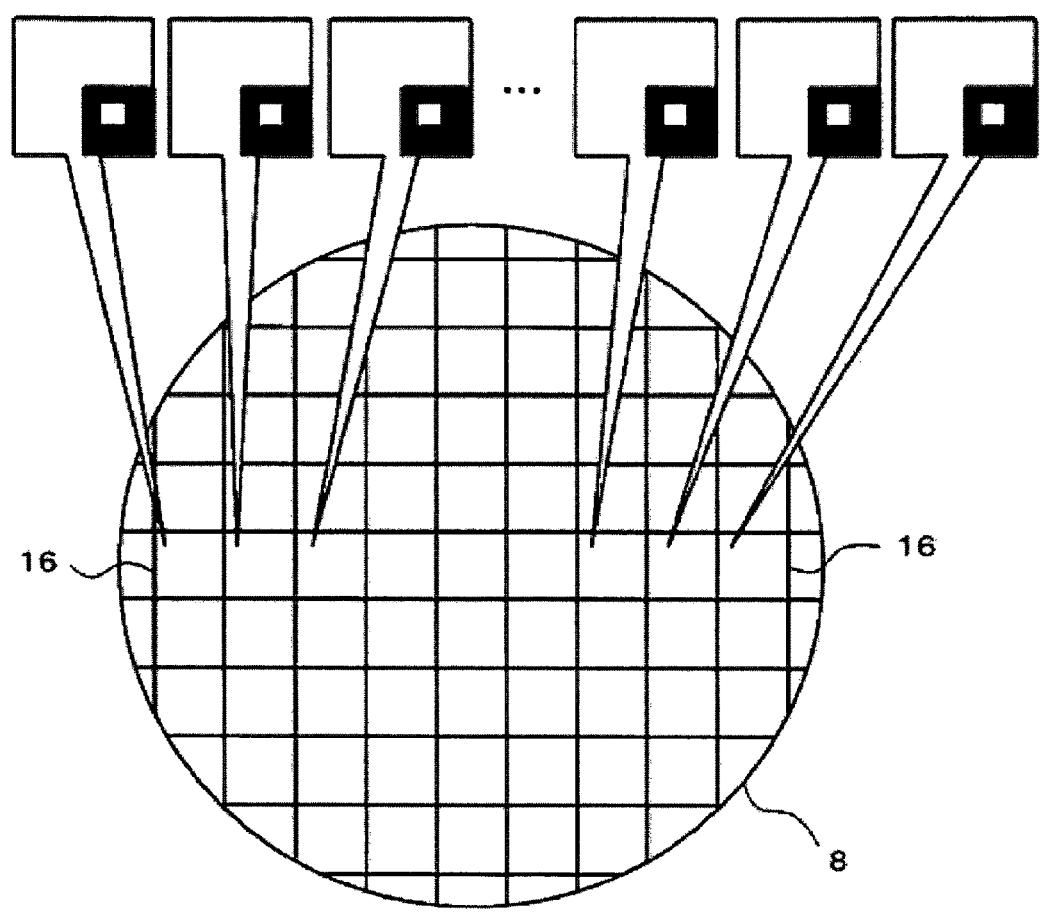
FIG. 5 is a diagram explaining an imaging method for imaging position shift amount measurement.

An operator prepares the wafer 8 which has a recurrent pattern of rectangles (chip 16) as shown in FIG. 5. The operator fixes this wafer 8 on a stage 14 of the substrate imaging device 9. The operator performs alignment with a loader unit 12 to adjust, such that the X-Y axis direction of the stage 14 and array direction of the chips 16 are parallel. In this condition, the operator displays the image of the wafer 8 taken by the camera 3 on the display 26 of the substrate imaging device 9. The operator confirms the image taken by the camera 3 and identifies an arbitrary point on each chip as a base position. At the base position, a position is selected where a unique pattern that can be used to uniquely identify the position within the chip 16 is formed. The control unit 21 memorizes the position coordinates of the base position within the chip 16.

(Obtaining Base Image)

Next, the control unit 21 controls the stage control device 10 and obtains a coordinate value of the base position for each chip arranged in the X-direction and the Y-direction of the base, where the chip (center chip) includes the center of the stage wafer 8. Next, based on each of the coordinate values obtained, the control unit 21 moves and stops the stage 14 in order so that the camera 3 faces the base position of each of the chips 16. The control 21 supplies an imaging trigger to the camera 3 through the input/output 25 while the chip 16 for imaging is in a still state to have an image of the base position taken. In addition, it is desirable to determine the center (a position on a light axis) of the image as the base position. The control unit 21 obtains the image taken by the camera 3, determines the image as the base image, and stores it in the main memory unit 22 or external memory unit 23. The control unit 21 repeats the movement of stage 14 and the imaging of the camera to obtain an image group (base image group) of the base positions of the each of imaging object chips 16.

Figure 6:
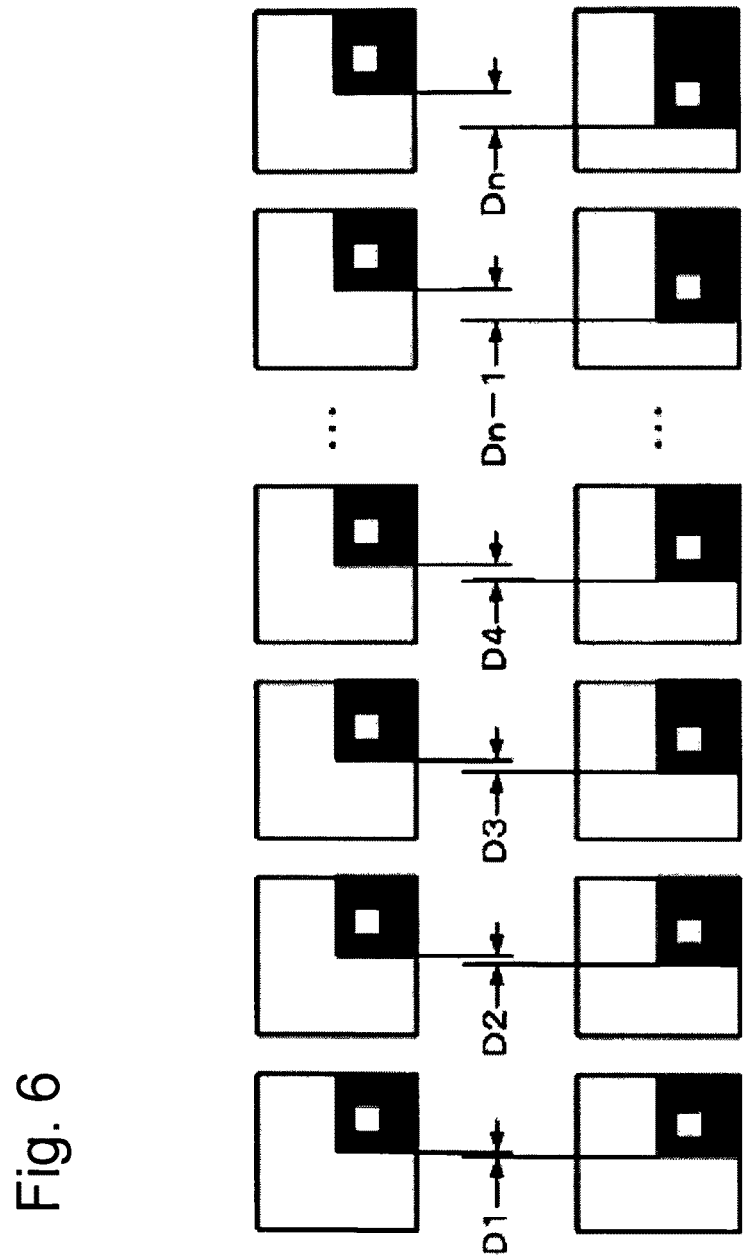
FIG. 6 is a diagram explaining an imaging position shift amount measurement method.

The upper column in FIG. 6 shows an example of the base image group. The position for imaging each base image is the position where the position detected with the position detecting sensor 7 and the stage position detecting section 6 is corrected considering the error in expansion and contraction due to the temperatures of the stage 14 and wafer 8 etc., and is the accurate base position for each chip. In other words, the base image is an image of a position where the camera 3 was facing at the time when the image trigger is generated.

(Obtaining Evaluation Image)

Next, the substrate imaging device 9 takes the image of the base position of each chip while moving the stage 14 in a constant speed against the camera 3 (scan imaging) for the column (arranged in a straight line) of the base positions arranged on the same imaging object chips 16 as the one used to obtain the base image of each chip. More concretely, the control unit 21 controls the stage control device 10 to move the stage 14 at a predetermined drive speed. Further, the control unit 21 generates an imaging trigger at the time when the camera 3 is facing (or thought to be facing) the base position of each chip 16 on the wafer 8 based on the position detected by the stage position detection section 6. In response to this imaging trigger, the camera 3 takes an image of the position facing the chip 16. The control unit 21 loads the image taken by the camera 3.

The control unit 21 controls the stage control device 10 to change the drive speed of stage 14 in multiple steps from low-speed to high-speed and performs the scan imaging at each speed.

The upper column in FIG. 6 indicates an example of a base image group. Meanwhile, the lower column in FIG. 6 indicates an example of an image group obtained by scan imaging the position of each base image on the upper column.

(Determination of Prediction Formula)

Next, the control unit 21 measures each of the evaluation images obtained to determine how much the base position which should be on the image center, is shifted in the moving direction against the base position in the corresponding base image obtained. As shown in FIG. 6, the evaluation images on the lower column scanned against the base images on the upper column are delayed by D1 to Dn. In other words, the imaging position of the camera 3 is ahead of the position where the light axis of the camera 3 is facing at the time when the imaging trigger is generated. For example, the control unit 21 obtains the shift of the base position on the corresponding base image and evaluation image by pattern matching, and identifies the shift amount by pixel count. The control unit 21 obtains a shift amount D by multiplying the obtained pixel count and the distance per pixel.

The control unit 21 corresponds the obtained shift amounts D1 to Dn to the drive speed V at the time of obtaining the value, and distance L to the corresponding base position from the drive starting position, and stores them in the main memory unit 22 or external memory unit 23. The information such as the temperature of stage 14 may be added to the memory data.

Figure 7:
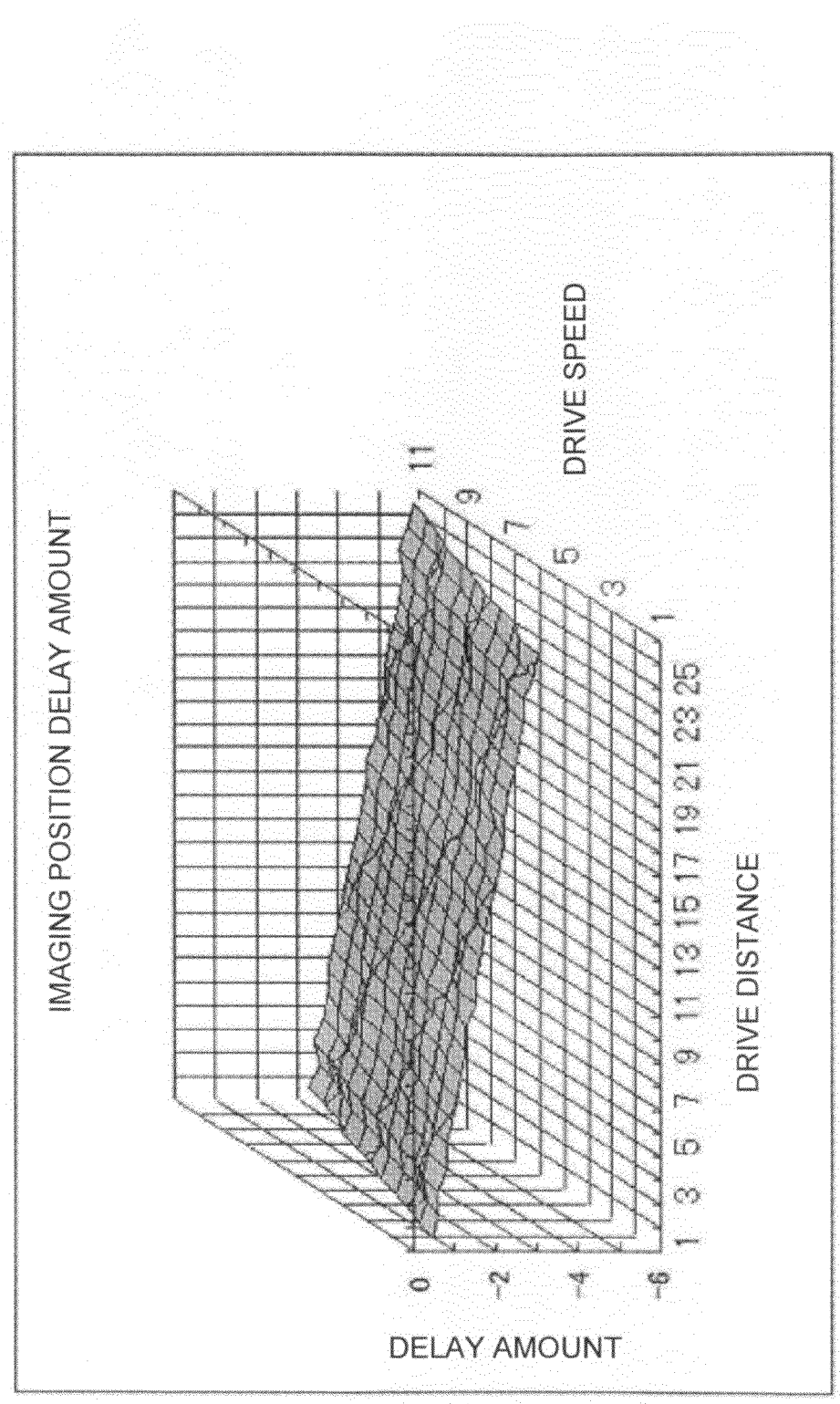
FIG. 7 is a graph showing an example of a shift amount measured against a drive speed and distance from a drive origin.

FIG. 7 is a graph showing an example of a delay amount (shift amount) measured against the drive speed and distance from the drive starting point. In addition, in FIG. 7, the drive speed (moving speed) is the speed of the table 14 driven by the loader unit 12 (relative speed to the camera 3 and wafer 8). The drive distance indicates, for example, the distance to the base position from the end of the wafer 8, and the delay amount (shift amount) is indicated by a negative value. The unit is an arbitrary unit.

As shown in FIG. 7, the delay amount of the imaging position increases as the moving speed of stage 14 is faster and the moving distance is longer.

As shown in FIG. 7, the delay amount of the imaging position is indicated in a virtual plane (linear function) against the drive speed and drive distance (distance from the drive starting point). The control unit 21 obtains each coefficient of the prediction formula for the shift amount D from the inclination of the place of delay amount, and the delay amount axis intercept. That is, the control unit 21 determines the drive speed coefficient b1, distance coefficient b2, and constant term b0 of the shift amount prediction formula by regression analysis using the base position of the chip (namely, the distance from the drive starting point) and the drive speed as an independent variable and the measured shift amount as a dependent variable. The control unit 21 stores these coefficients in the external memory unit 23 as a unique parameter of the substrate imaging device 9.

A prediction value of the shift amount of the position to be imaged is calculated by substituting the distance of the position to be imaged from the drive starting point and drive speed of the stage into the obtained prediction formula. The image of the imaging subject position can be obtained by generating an imaging trigger earlier only by the predicted shift amount than the generation timing determined by the measurement value of the rotary encoder (stage position detection section 6) motor. In other words, the image of the imaging subject position can be obtained by generating an imaging trigger when the light axis of the camera 3 is at a position before the imaging subject position against the moving direction by the shift amount. Further, the prediction formula reflecting the stage drive characteristics of the substrate imaging device 9 can be derived by executing the procedure of determining the shift amount prediction formula by the substrate imaging device 9 (inspection device 1).

The control unit 21 controls the camera 3 and the stage control section 1 to obtain the base image and an evaluation image of each chip while moving the stage 14 in the x-axis direction, thereby the shift amount to the X-axis direction for the base image and the evaluation image of each chip, and further, the prediction formula of the X-axis direction is derived according to the obtained shift amount of the X-axis. Further, the control unit 21 obtains the base image and the evaluation image of each chip while moving the stage 14 in the Y-axis direction to obtain the shift amount to the Y-axis direction for the base image and the evaluation image of each chip, and further, the prediction formula for the obtained Y-axis direction is derived.

Figure 8:
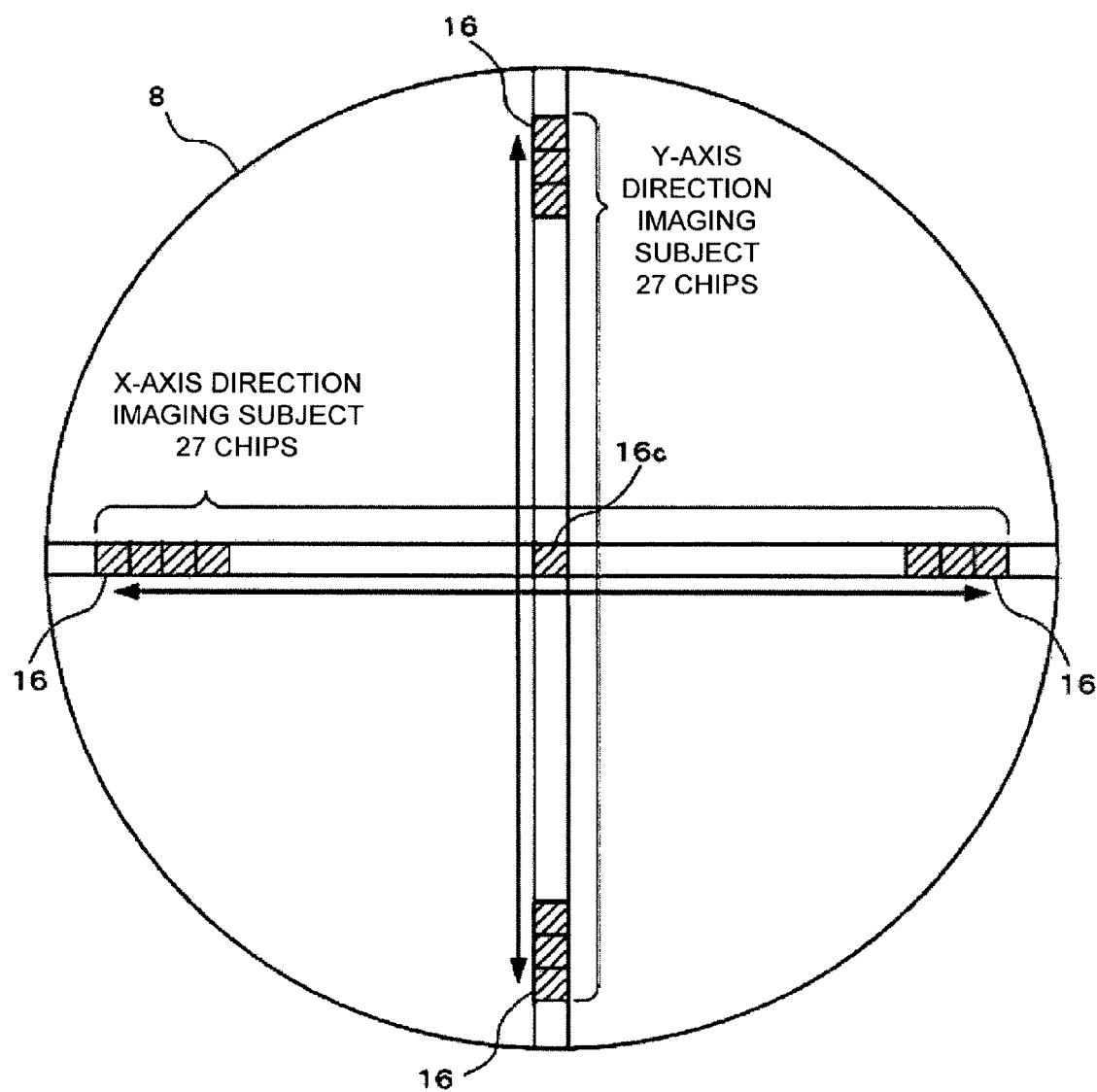
FIG. 8 is a diagram explaining an imaging position shift amount in a X-Y direction.

FIG. 8 is a figure explaining a method for measuring an imaging position shift amount in the X-Y axis direction. The chips 16 arranged on the wafer 8 are arrayed in up, down, left, and right directions including the chip 16c (center chip) located at the center of the wafer 8, and are the imaging subject chips. In the example of FIG. 8, the wafer 8 has a diameter of about 300 millimeters (mm), and the array including the center chip has 27 chips 16 in each of the X-axis and Y-axis directions. The control unit 21 controls the camera 3 and the stage control section 10, moves and stops the camera 3 at a position facing the base position of each chip 16 in order, to obtain the base image group by performing the imaging.

The control unit 21 measures the shift amount D against the distance L from the drive starting point of the base position of each chip 16 and drive speed V in each of the positive and negative directions of the X-axis, while changing the moving speed V for the chip array arranged in the X-axis direction.

Further, the control unit 21 measures the shift amount D against the distance L from the drive starting point of the base position of each chip 16 and drive speed V in each of the positive and negative directions of the Y-axis, while changing the moving speed V for the chip array arranged in the Y-axis direction. And the drive speed coefficient b1, distance coefficient b2, and constant term b0 of the shift amount prediction formulas for each of the X-axis positive direction and the X-axis negative direction, the Y-axis positive direction and the Y-axis negative direction are determined by performing regression analysis using the distance L from the drive starting point of the base position of each chip and the drive speed V as an independent variable and the measured shift amount D as a dependent variable. The control unit 21 stores these coefficients in the external memory unit 23 as a device inherent parameter.

Figure 9:
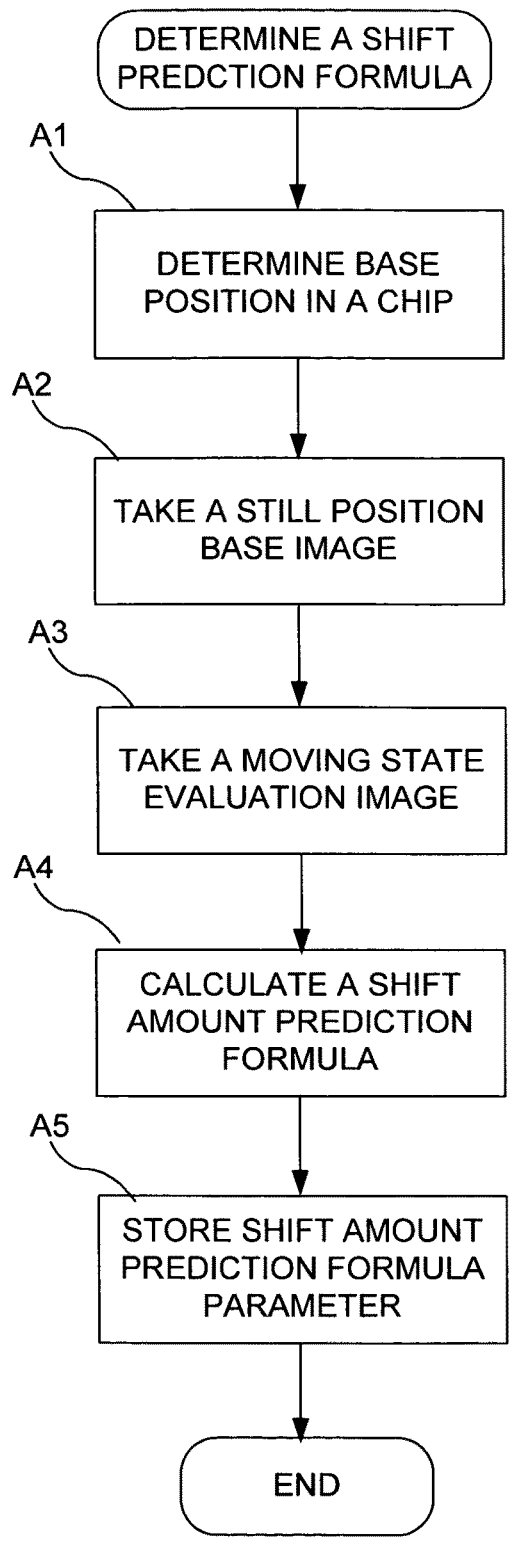
FIG. 9 is a flowchart showing an example of an operation to determine a shift amount prediction formula.

Next, explained is an operation of the substrate imaging device 9. FIG. 9 is a flowchart showing an example of an operation for determining a shift amount prediction formula.

As described above, first, the control section 21 determines the base position in the chip 16 according to the operation of an operator, identifies each chip base position for imaging, and obtains the coordination in the chip. The control section 21 further obtains the coordinates of the base position of each chip on the wafer and stores it in the main memory unit 22 (step A1). The imaging subject chip is, for example, a chip on the maximum row in each of the X-axis direction and the Y-axis direction, as shown in FIG. 8.

The control unit 21 moves the stage 14 and stops in a condition where the camera 3 is facing the base position by giving an instruction to the stage control unit 10a through the input/output 25 to control the stage driving section 5 based on the set coordinates of the base position in response to an instruction from the operating unit 24, for example. Further, the control unit 21 supplies an imaging trigger to the camera 3 as needed, and images the base position of the control section imaging subject chip while the chip 16 is still. The control unit 21 accumulates the obtained base image in the main memory unit 22 or external memory unit 23 (step A2). The control unit 21 executes a similar operation on all of the imaging subject chips 16.

Next, the control unit 21 images the base position of the imaging subject chip while moving the wafer 8 and camera 3 relatively, and accumulates the obtained evaluation image in the main memory unit 22 or external memory unit 23 (step A2). The control unit 21 performs imaging by changing the drive (moving) speed in several stages.

Next, the control unit 21 compares the base image taken in a still state at the step A2 and the evaluation image (scan image) taken while moving relatively in the step S3, and measures the delay amounts at each of the drive speeds and moving distances.

Next, from the delay amount against the drive speeds and drive distances, each of the coefficients b0 to b2 of the shift amount prediction formula is calculated by the regression analysis (step A4). The shift amount prediction formulas are obtained for each of the X-axis and Y-axis and are then stored in the external memory as a unique parameter of the substrate imaging device 9 (step A5).

Figure 10:
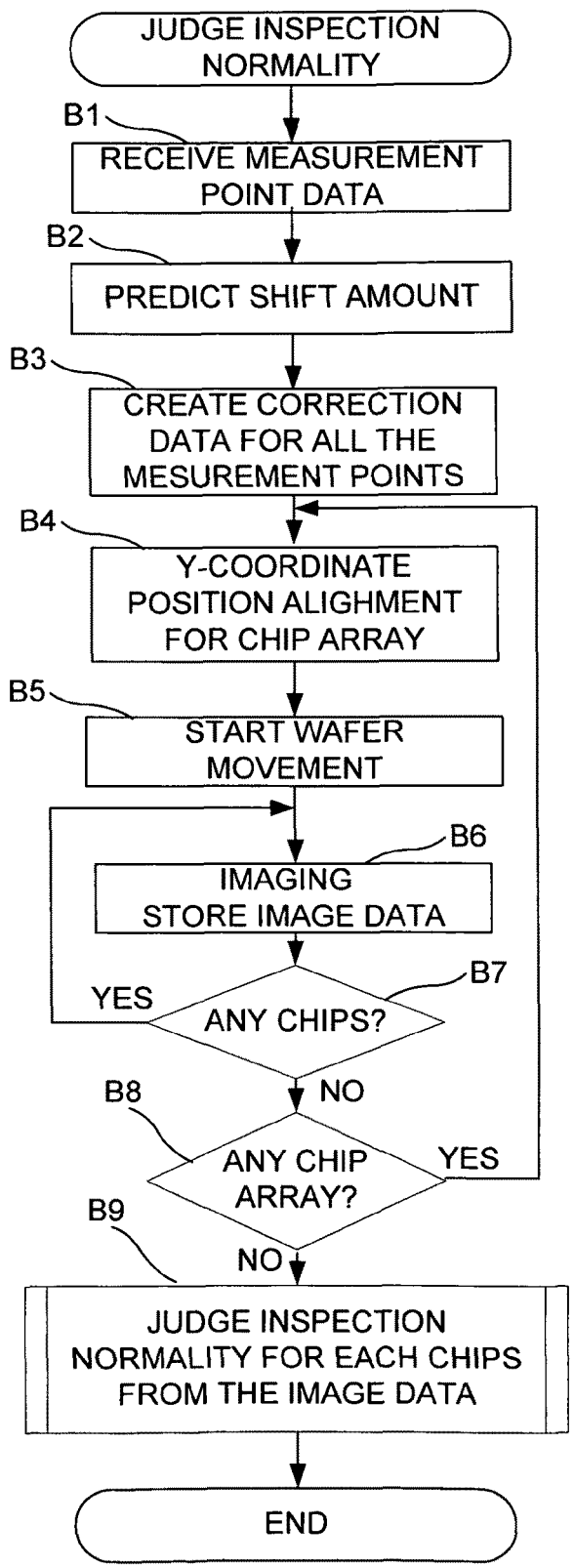
FIG. 10 is a flowchart showing an example of an operation for judging a normal inspection in a substrate imaging device pertaining to an embodiment of the present invention.

FIG. 10 is a flowchart of an example of a procedure for judging the inspection using the probe card 4 which may be completed normally or not in the substrate imaging device 9 pertaining to an embodiment of the present invention.

First, prior to the judgment, the control section 21 determines the shift amount prediction formula (1) and stores it in the main memory unit 22 or external memory unit 23 by performing the process in FIG. 9. Meanwhile, an operator (inspector) fixes the wafer 8 to be inspected on the stage 14, and aligns the direction of the chip array and the moving direction of the stage 14. In FIG. 10, a case where the imaging is performed while moving each array in the X-axis direction is assumed.

The operator inputs measuring points data (e.g. x, y coordinates) for all the chips 16 on the wafer 8 that are inspected from the operating unit 24 (step B1). The control unit 21 stores the input data in the main memory unit 22 or external memory unit 23.

The control unit 21 then sets an imaging path for the chip 16 to be inspected and judged. The imaging path may be determined by the control unit 21 or input by the operator from the operating unit 24. The control unit 21 predicts the shift amount with the formula (1) for the each of the plurality of chips 16 according to the set imaging path based on the relative moving speed of the camera 3 and wafer 8 and the distance from the base position (step B2).

The control unit 21 stores the shift amount precision data for all the chips to be inspected and determines in the main memory unit 22 or external memory unit 23 the correction data (step B3).

The control unit 21 controls the stage control device 10 through the input and output 24 to relatively move the camera 3 and wafer 8, thereby the light axis of the camera 3 is aligned in the position of the Y coordinate of the chip 16 on the end of one chip array that are being inspected and judged (step B4).

Next, the control unit 21 controls the stage control device 10 and starts to move the wafer 8 in the X-axis direction at a predetermined speed (step B5).

The control unit 21 corrects the timing (imaging trigger generation position) for generating an imaging trigger with the stored correction data for the base position of the first chip in the array. In other words, assuming that the distance from a movement starting point to a base point is L and the correction amount is D, the control unit 21 generates an imaging trigger signal to the camera 3 at the point when detecting the wafer 8 (stage 7) moved in the X-direction on for a distance (L-D), and supplies it to the camera 3. The camera 3 takes an image of the facing position (chip) of the wafer 8 responding to the imaging trigger. The control unit 21 inputs the image data from the camera 3 and stores in the main memory unit 22 or the external memory unit 23 (step B6).

The control unit 21 determines whether there is another chip 16 for imaging on the same chip array (on the X-axis) or not according to the imaging path (steps SB7), if so (step SB7; Yes), repeat the corrected imaging with the shift amount and storing the imaged data for the next chip 16 (steps B6 and B7).

Figure 11:
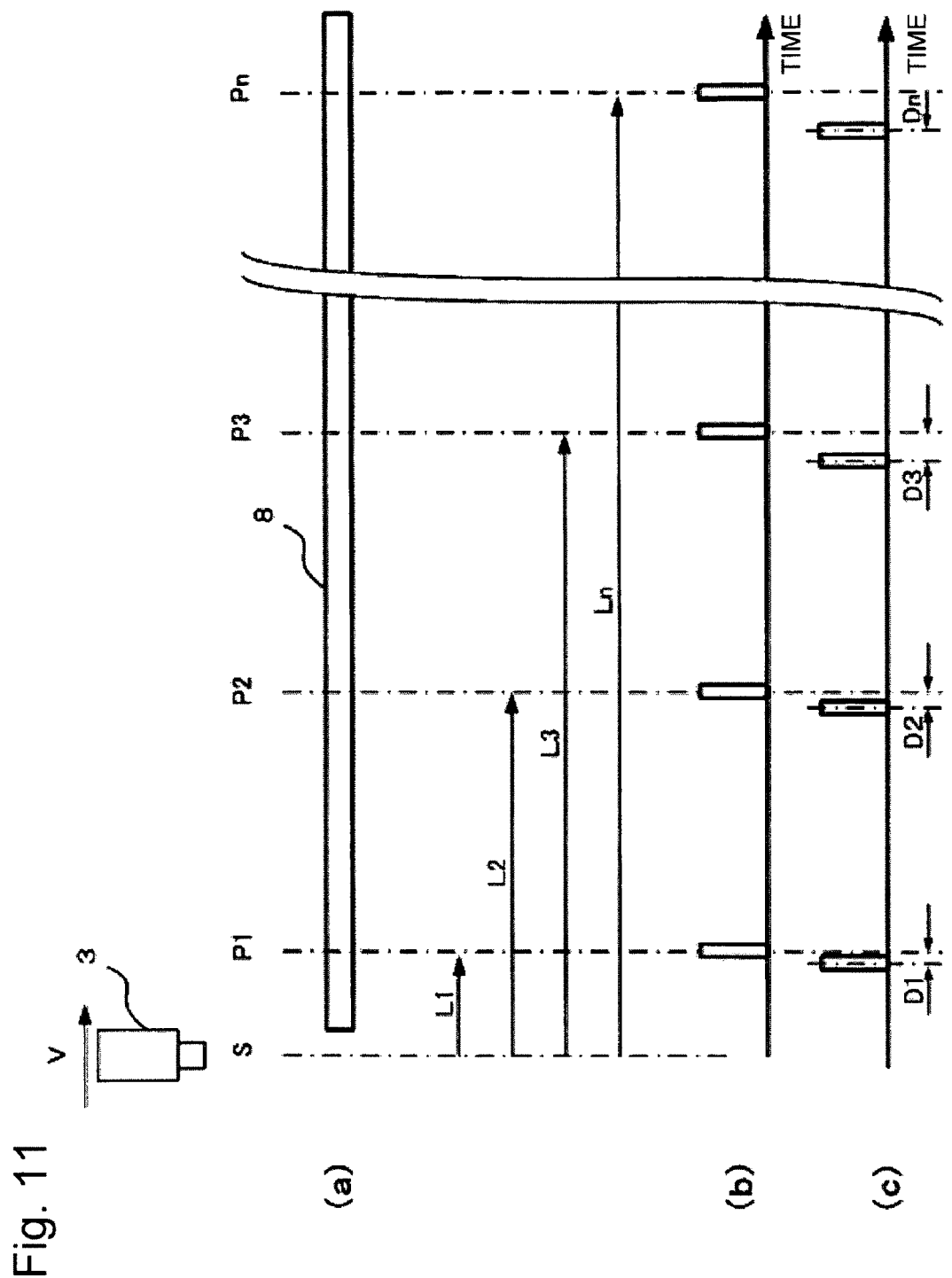
FIG. 11 is a diagram explaining an imaging operation of a substrate imaging device pertaining to an embodiment of the present invention.

For example, as shown in FIG. 11(a), assuming that imaging points P1 to Pn exist on a X-axis, the camera 3 moves from the start point S at a speed V, and each of the distances from the starting point S to the imaging points P1 to Pn is L1 to Ln. The shift amounts that are obtained in advance are stored in the memory unit as D1 to Dn.

In a case when the timing of the imaging trigger is not corrected, the control unit 21 generates the imaging trigger signal as shown in FIG. 11(b) as the control unit 21 detects that the camera 3 has reached a position facing the imaging points P1 to Pn.

Meanwhile, in the embodiment, the control unit 21 generates the imaging trigger signal as shown in FIG. 11(c) as it detects the camera 3 reaching the position before each of the imaging points P1 to Pn by the shift amount D1 to Dn. The control unit 21 generates an imaging trigger when, for example: (i) it determines that the position of the light axis of camera 3 reached a position which is before the imaging subject position by D1 to Dn from an output of the stage position detecting section 6 etc.; (ii) it detects the moving distance of camera 3 has reached (L1-D1)~(Ln-Dn) the stage position detecting section 6; or (iii) it detects the moving time of stage 7 has elapsed ((L1-D1)/V)~(Ln-Dn)/V).

When the control unit 21 determines that there is no chip 16 to be examined in that array (step B7; No), it checks if there are any chip arrays to be examined according to the imaging path (step B8). When there are chip arrays to be examined (step B8; Yes), the control unit 21 aligns to the Y-axis of the chip array (step B4), and begins to scan and image that chip array (step B5 to step B7).

When the control unit 21 completes the scan image for all the chips to be examined on the wafer 8,(step B8; No), it extracts a probe trace pattern from each of the image data that has been stored, and determines whether the inspection is performed properly or not (step B9). The judgment of inspection normality of each chip according to the image data may be performed parallel to the scan imaging.

The substrate imaging device 9 above corrects the imaging trigger for imaging the chip 16 to be examined according to the shift amount prediction formula against a drive speed and drive distance that are obtained in advance. Therefore, even when the image of the electrode pad position of the chip 16 is taken while moving the wafer 8 to be examined against the camera 3, the imaging position does not shift, thereby an image having an accurate position can be obtained. As a result, a judgment of examination normality can be performed accurately and quickly.

In addition, the hardware configuration and flowcharts are only examples, and may be changed or modified arbitrarily.

For example, the shift amount may be predicted and the imaging time may be corrected sequentially each time an image of a chip 16 is taken.

Further, for example, the subject is not limited to a semiconductor wafer or chip, as it may be anything as long as a regular pattern is formed.

Further, it is not limited to a way in which the stage is moved, and a way in which the camera is moved may also be used.

Further, the generation of the timing of the imaging trigger may be corrected by preparing prediction formulas (1) for each of the variable parameters (e.g. temperature of stage 14) and storing it in the external memory unit 23 etc., obtaining variable parameters with a thermometer etc. at the imaging stage, and obtaining the delay amount by correcting the prediction formula according to the obtained parameter.

In addition, it is possible to predict the delay amount only with a speed term ignoring the distance term ($b_2=0$).

In addition, in the embodiments described above, the inspection device 1 (substrate imaging device 9) itself has all of the configurations for obtaining the shift amount D, obtaining the (coefficient of) prediction formula from the shift amount, and correcting the timing for generating the imaging trigger. However, it is not limited to this. For example, the shift amount D and the prediction formula may be obtained with another device (e.g. dedicated device) different from the inspection device 1 and the inspection device 1 may store the obtained prediction formula (or coefficient). In such a method, each inspection device 1 can correct the generating timing of the imaging trigger.

The inspection control unit 2 of the inspection device 1 can be realized by using an ordinary computer system, instead of a dedicated system. For example, the image process unit 2 for executing the process described above may be formed by storing a program for executing the operation described above on a computer readable memory medium (e.g. flexible disk, CD-ROM, DVD-ROM etc.), distributing the medium, and installing the computer program on a computer. Further, the inspection control unit 2 of the present invention may also be formed by storing the computer program on a memory device in a server device on a communication network, such as the Internet, and having an ordinary computer download the program, etc.

Further, in a case when each of the functions described above is realized by the role sharing of an OS (operating system), an application program, or cooperation of an OS and an application program, only the application program section may be stored in a memory medium or memory device.

Further, the computer program described above may be superimposed on a carrier wave and delivered through a communication network. This application claims priority to Japanese patent application No. 2006-129778, filed on May 9, 2006 and claims, specification, figures, abstract of the Japanese application is incorporated herein by reference in its entirety.

INDUSTRIAL APPLICABILITY

The present invention is applicable to an inspection device etc. for inspecting a semiconductor chip manufactured in a semiconductor manufacturing process etc.

What is claimed is:

1. A method of correcting an imaging position, comprising the steps of:
moving a subject and a camera relatively;
capturing an image of the subject with the camera in response to an imaging trigger;

predicting a shift amount of a position where the imaging trigger is generated compared to a position where the image of the subject is captured, based on a relative moving speed of the subject and the camera in the capturing step;

correcting a timing of generating the imaging trigger such that the imaging trigger is generated in a position that is shifted from the imaging position of the subject by a correction amount based on the shift amount obtained in the predicting step; and measuring a shift amount of a position where the imaging trigger is generated compared to a position of capturing the image of the subject, wherein the step of measuring the shift amount comprises a step of determining a shift amount prediction formula according to the relative moving speed and a moving distance of the subject and the camera, the shift amount prediction formula is defined by:

ti $D=b_0+b_1 \cdot V+b_2 \cdot L$ wherein:
V and L are respectively a relative moving speed and a moving distance of the subject and the camera, and
$b_0$: constant coefficient (meters),
$b_1$: coefficient of speed term (seconds), and
$b_2$: coefficient of distance term.

2. The method of claim 1, wherein the step of predicting the shift amount comprises predicting the shift amount based on the relative moving speed and a moving distance of the subject and the camera.

3. The method of claim 1, wherein the step of capturing the image of the subject comprises taking an image of the subject while relatively moving the subject and the camera at a plurality of different speeds.

4. The method of claim 3, wherein the plurality of different speeds includes at least two directions; a direction perpendicular to a plane of the subject and a direction horizontal to the plane of the subject.

5. The method of claim 1, wherein the shift amount of the position obtained in the predicting step includes a shift amount based on a relative displacement from a base position of the subject and the camera according to the shift amount prediction formula obtained in the measuring step.

6. An imaging method comprising the steps of:
moving a subject and a camera relatively;
taking an image of the subject with the camera in response to an imaging trigger;
predicting a shift amount of a position where the imaging trigger is generated compared to a position where the image of the subject is captured, based on a relative moving speed of the subject and the camera;
generating the imaging trigger at a timing that is corrected based on the relative moving speed of the subject and the camera and using the shift amount obtained in the predicting step;
measuring a shift amount of a position of the camera where the imaging trigger is generated compared to a position where the image of the substrate is taken, wherein the timing of generating the imaging trigger is corrected based on the measuring step, and wherein measuring results are used for determining coefficients of a shift amount prediction formula which are used in the predicting step, the shift amount prediction formula is defined by:

$D=b_0+b_1 \cdot V+b_2 \cdot L$ wherein:
V and L are respectively a relative moving speed and a moving distance of the subject and the camera, and
$b_0$: constant coefficient (meters),
$b_1$: coefficient of speed term (seconds), and
$b_2$: coefficient of distance term.

7. The imaging method of claim 6, wherein the step of generating the imaging trigger comprises correcting the generating timing of the imaging trigger based on the relative moving speed and the moving distance of the subject and the camera.

8. The imaging method of claim 6,
wherein the step of generating the imaging trigger comprises generating an imaging trigger at a timing when the camera is facing a position which is before a subject imaging position only by the shift amount predicted in the step of predicting the shift amount.

9. A substrate imaging apparatus comprising:
an imaging unit for taking an image of a substrate;
a transferring unit for moving the substrate and the imaging unit relatively when taking the image of the substrate;
a shift amount prediction unit for predicting a shift amount of an imaging trigger which starts the imaging of the imaging unit based on a relative moving speed of the substrate and the imaging unit when capturing the image of the substrate;
an imaging trigger correction unit for correcting a timing of generating the imaging trigger using the shift amount obtained by the shift amount prediction unit; and
a shift amount measuring unit for measuring a shift amount of a position of the imaging unit where the imaging trigger is generated compared to a position where the image of the substrate is captured,
wherein the shift amount prediction unit predicts the shift amount of imaging trigger according to measuring results obtained by the shift amount measuring unit, and
wherein the shift amount prediction unit predicts the shift amount of the imaging trigger by using a shift amount prediction formula defined by:

$D=b_0+b_1 \cdot V+b_2 \cdot L$ wherein:
V and L are respectively a relative moving speed and a moving distance of the substrate and the camera, and
$b_0$: constant coefficient (meters),
$b_1$: coefficient of speed term (seconds), and
$b_2$: coefficient of distance term.

10. The substrate imaging apparatus of claim 9, wherein the shift amount prediction unit predicts the shift amount according to the relative moving speed and a relative moving distance of the substrate and the imaging unit.

11. The substrate imaging apparatus of claim 9 further comprising a base substrate imaging unit for taking an image of a base substrate while moving the base substrate and the imaging unit relatively, wherein the base substrate imaging unit takes the image of the substrate while moving the base substrate and the imaging unit relatively at a plurality of different speeds.

12. The substrate imaging apparatus of claim 11, wherein the plurality of different speeds include at least two directions; a direction perpendicular to a plane of the substrate and a direction horizontal to the plane of the substrate.

13. The substrate imaging apparatus of claim 9, wherein the shift amount predicted by the shift amount prediction unit includes the shift amount based on a relative displacement from a base position of the substrate and the imaging unit.

14. A substrate imaging apparatus comprising:
an imaging unit for imaging a subject in response to an imaging trigger;

a moving unit for moving the subject and the imaging unit relatively;

a shift amount prediction unit for predicting a shift amount of an actual imaging position and the position in which the imaging unit is located when an imaging trigger is generated based on a relative moving speed of the subject and the imaging unit; and an imaging trigger generation unit for generating the imaging trigger when the imaging unit reaches a position which is located before an imaging area of the subject only by the predicted shift amount;

a shift amount measuring unit for measuring a shift amount of the actual imaging position to determine a shift amount prediction formula which is used by the shift amount prediction unit, the shift amount prediction formula is defined by:

$$D = b_0 + b_1 \cdot V + b_2 \cdot L$$

wherein:
V and L are respectively a relative moving speed and a moving distance of the subject and the camera, and
$b_0$: constant coefficient (meters),
$b_1$: coefficient of speed term (seconds), and
$b_2$: coefficient of distance term.

15. The substrate imaging apparatus of claim 14, wherein the shift amount prediction unit predicts the shift amount according to the relative moving speed and a relative moving distance of the subject and the imaging unit.

16. A computer program for a computer to execute the steps of:

moving a substrate and a camera relatively;

taking an image of the substrate with the camera in response to an imaging trigger;

predicting a shift amount of a position where the imaging trigger is generated, compared to a position when taking the image of the substrate based on a relative moving speed of the substrate and the imaging unit in the step of taking the image;

correcting a timing of generating the imaging trigger based on the shift amount obtained in the predicting step;

measuring a shift amount of a position where the imaging trigger is generated compared to a position of capturing the image of the substrate, wherein the measuring results are used for determining coefficients of a shift amount prediction formula which are used in the predicting step, the shift amount prediction formula is defined by:

$$D = b_0 + b_1 \cdot V + b_2 \cdot L$$

wherein:
V and L are respectively a relative moving speed and a moving distance of the substrate and the camera, and
$b_0$: constant coefficient (meters),
$b_1$: coefficient of speed term (seconds), and
$b_2$: coefficient of distance term.

* * * * *

UNITED STATES PATENT AND TRADEMARK OFFICE
CERTIFICATE OF CORRECTION

PATENT NO. : 8,654,190 B2  
APPLICATION NO. : 12/227141  
DATED : February 18, 2014  
INVENTOR(S) : Hiroshi Kawaragi Page 1 of 1

It is certified that error appears in the above-identified patent and that said Letters Patent is hereby corrected as shown below:

In the Claims

Column 15, line 19 please replace "ti $D=b_0+b_1.V+b_2.L$" with --$D=b_0+b_1 \cdot V+b_2 \cdot L$--

Signed and Sealed this  
Seventeenth Day of June, 2014

Michelle K. Lee  
*Deputy Director of the United States Patent and Trademark Office*